United States Patent

Beau et al.

(10) Patent No.: US 8,814,247 B2
(45) Date of Patent: Aug. 26, 2014

(54) VEHICLE COVERING HAVING A FRAME, TRIM AND A DECORATIVE ELEMENT

(75) Inventors: Godefroy Beau, La Garenne Colombes (FR); Jean-François Oeuvrard, Cergy Pontoise (FR)

(73) Assignee: Faurecia Interieur Industrie, Nanterre (FR)

( * ) Notice: Subject to any disclaimer, the term of this patent is extended or adjusted under 35 U.S.C. 154(b) by 12 days.

(21) Appl. No.: 13/592,167

(22) Filed: Aug. 22, 2012

(65) Prior Publication Data

US 2013/0221695 A1 Aug. 29, 2013

(30) Foreign Application Priority Data

Aug. 23, 2011 (FR) ...................................... 11 57475

(51) Int. Cl.
*B60R 13/02* (2006.01)
(52) U.S. Cl.
USPC ......................................... 296/39.1; 296/1.08
(58) Field of Classification Search
USPC .............. 296/39.1, 1.08, 1.09, 152, 146.7, 70
See application file for complete search history.

(56) References Cited

U.S. PATENT DOCUMENTS

| | | | | |
|---|---|---|---|---|
| 5,952,630 | A * | 9/1999 | Filion et al. .................... | 200/5 R |
| 6,371,548 | B1 * | 4/2002 | Misaras ...................... | 296/146.7 |
| 6,644,727 | B2 * | 11/2003 | Audibert et al. .............. | 296/210 |
| 7,055,887 | B2 * | 6/2006 | Williams et al. ............ | 296/146.7 |
| 7,070,221 | B2 * | 7/2006 | Cowelchuk et al. ......... | 296/39.1 |
| 7,104,590 | B2 * | 9/2006 | Dooley et al. ................. | 296/153 |
| 7,156,437 | B2 * | 1/2007 | Cowelchuk et al. ......... | 296/1.08 |
| 7,879,424 | B2 * | 2/2011 | Smith et al. ..................... | 428/71 |
| 7,922,227 | B2 * | 4/2011 | Beau ............................ | 296/1.08 |
| 8,337,981 | B2 * | 12/2012 | Baudouin et al. .......... | 428/309.9 |
| 2005/0186388 | A1 * | 8/2005 | Mekas et al. .................. | 428/116 |
| 2005/0194806 | A1 * | 9/2005 | Cowelchuk et al. ......... | 296/1.09 |
| 2006/0008620 | A1 | 1/2006 | Cowelchuk et al. | |
| 2009/0315308 | A1 | 12/2009 | Beau | |
| 2013/0221695 | A1 * | 8/2013 | Beau et al. .................... | 296/1.08 |

FOREIGN PATENT DOCUMENTS

| | | |
|---|---|---|
| DE | 19937274 A1 | 2/2001 |
| DE | 10312250 B3 | 8/2004 |
| FR | 2729913 A1 | 8/1996 |
| FR | EP0949124 A2 | 10/1999 |
| FR | 2850077 A1 | 7/2004 |
| FR | 2869005 A1 | 10/2005 |
| WO | WO2006/072566 A1 | 7/2006 |
| WO | WO2007/128908 A1 | 11/2007 |

OTHER PUBLICATIONS

French Search Report for FR 1157475 dated Feb. 16, 2012, 2 pages.

* cited by examiner

*Primary Examiner* — Glenn Dayoan
*Assistant Examiner* — Gregory Blankenship
(74) *Attorney, Agent, or Firm* — Reising Ethington P.C.

(57) ABSTRACT

A vehicle covering that includes a frame, a trim having a skin covering the frame, and a decorative element positioned on a visible external face of the skin. The vehicle covering further includes a stiffening component positioned in the trim locally facing the decorative element and capable of limiting deformations of the trim by compression.

20 Claims, 1 Drawing Sheet

VEHICLE COVERING HAVING A FRAME, TRIM AND A DECORATIVE ELEMENT

TECHNICAL FIELD

The invention relates to a vehicle covering of the type that includes a frame, a trim comprising a skin covering the frame, and a decorative element positioned on an external face of the skin.

BACKGROUND

With a flexible trim compressible to touch, it is possible to obtain a comfortable touch and quality perceived as satisfactory.

FR 2 729 913 discloses a vehicle covering, in which the trim comprises a foam layer interposed between the skin of the trim and the stiff frame, so as to give flexibility to the trim.

FR 2 850 077 discloses a vehicle covering of the aforementioned type, in which the flexible trim comprises projections made with the skin in the same material and which bear upon the frame so as to give flexibility to the trim.

A decorative element attached on the trim provides a finish to the covering. Different decorative elements may be provided according to the selected finish or options.

A decorative element is for example provided as a thin and flexible sheet applied upon the skin. A final user may touch the decorative element. Because of the flexibility of the decorative element and of the deformability of the trim to the touch, there exists a risk of detaching the decorative element and the trim and/or of breaking the decorative element, because of a too large deformation of the decorative element and of the trim.

SUMMARY

One of the objects of the invention is to propose a motor vehicle covering comprising a decorative element on a trim of the covering, which may be manufactured simply and economically while limiting the risks of deteriorating the decorative element and reducing the flexible touch of the trim facing this decorative element.

For this purpose, the invention proposes a vehicle covering of the aforementioned type characterized in that it further comprises stiffening component or stiffening means positioned in the trim locally facing the decorative elements and able to limit deformations of the trim by compression.

According to other embodiments, the covering comprises one or more of the following features, taken individually or according to all technically possible combinations:
- the stiffening component comprises a boss formed in the frame locally facing the decorative element and protruding towards the skin;
- the stiffening component comprises at least one protrusion made in one piece with the frame, located locally facing the decorative element and protruding from the frame towards the skin;
- the stiffening component comprises several protrusions facing the decorative element;
- the stiffening component comprises at least one protrusion as a pin or a rib;
- the stiffening component comprises a block added between the frame and the skin facing the decorative element;
- the block is porous;
- the block is stiffer in compression than an intermediate layer of the trim interposed between the skin and the frame;
- the trim comprises an intermediate layer interposed between the skin and the frame;
- the intermediate layer interposed between the skin and the frame is a foam layer giving a soft touch to the trim;
- the thickness of the intermediate layer facing the decorative element is 30 to 80% smaller than that around the decorative element, preferably 40 to 70% less;
- the soft touch of the trim is reduced facing the decorative element.

The invention also relates to a motor vehicle comprising a covering as defined above.

BRIEF DESCRIPTION OF THE DRAWINGS

The invention and advantages thereof will be better understood upon reading the description which follows, only given as an example and made with reference to the appended drawings, wherein.

DETAILED DESCRIPTION OF THE ILLUSTRATED EMBODIMENTS

Figure 1:
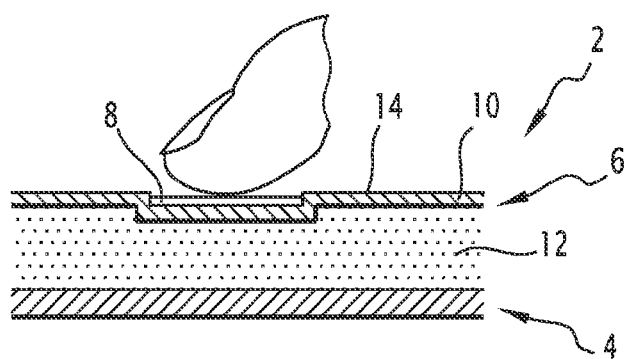
FIG. 1 is a schematic sectional view of a covering.

The covering illustrated in FIG. 1 is an inner covering of the vehicle, for example a motor vehicle. The covering 2 is for example a dashboard of a motor vehicle.

The covering 2 comprises a stiff frame 4, a flexible trim 6 covering the frame 4 and a decorative element 8 positioned on the trim 6.

The frame 4, sometimes called an "insert", is curved in order to give its curvature to the covering 2. The covering portion 2 illustrated in FIG. 1 is planar.

The frame 4 is for example made in a thermoplastic material, for example a polyolefin, a homopolymer or copolymer, optionally comprising mineral fillers or a reinforcement with glass fibers, or for example in ABS-PC (acrylonitrile-butadiene-styrene and polycarbonate), optionally reinforced with glass fibers. These materials have stiffness allowing them to fulfill a supporting function.

The trim 6 is compressible to the touch. It gives the covering a pleasant soft touch and adding value thereto.

The trim 6 comprises a skin 10 covering the frame 4 and an intermediate layer 12 interposed between the skin 10 and the frame 4.

The skin 10 comprises an external face 14 oriented outwards from the covering 2, opposite the frame 4 and intended to be visible. The external face 14 defines the visible face of the covering 2.

The intermediate layer 12 is for example a foam, notably a PU (polyurethane) foam.

Alternatively, the intermediate layer 12 is a gel. Still alternatively, the trim 6 may comprise ribs made with the skin in the same material and protruding from the skin and bearing upon the frame.

The skin 10 is flexible. It appears as a thin sheet made in a synthetic or natural material. The skin 10 is for example provided as a sheet of plastic material, a fabric of synthetic or natural fibers, leather, or leather substitute.

The decorative element 8 appears as a thin and flexible sheet cut according to a determined profile.

The decorative element 8 is fitted into the skin 10 so that it is flush with a peripheral region of the external face 14 surrounding the decorative element 8 or set back towards the interior of the trim 6 relatively to this peripheral region.

Such a covering 2 is made by thermoforming the skin 10 against the decorative element 8, and then by forming the intermediate layer 12 between the skin 10 and the frame 4. The intermediate layer 12 is for example obtained by molding with foaming between the skin 10 and the frame 4.

Alternatively, such a covering 2 is for example made by thermoforming the trim 6 against the decorative element 8 and the frame 4 in a thermoforming mold, so as to conform the trim 6 with the frame 4, to fit the decorative element 8 into the skin 10 and to secure together the frame 4, the trim 6 and the decorative element 8. The initially flat trim 6, and comprising the skin 10 and the intermediate layer 12, is inserted into the thermoforming mold, heated and pressed in the mold against the decorative element 8 and the frame 4, simultaneously or sequentially.

An adhesive layer (not shown) is interposed between the decorative element 8 and the skin 10 for attaching the decorative element 8 onto the skin 10. The adhesive layer is for example heat-activatable so as to be activated during thermoforming of the skin 10 against the decorative element, during the thermoforming of the trim 6 on the decorative element 8, or during the molding of the intermediate layer 12.

Because of the flexibility of the decorative element 8 and of the skin 10, and of the compressibility to touch of the trim 6, there exists a risk that a user pressing on the decorative element 8 deforms it in such a way that it deteriorates or is detached from the skin 10. Further, this flexibility of the decorative element 8 and of the skin 10 combined with the compressibility to touch of the trim 6 gives a soft touch to the trim facing the decorative element 8 which is not necessarily desired.

Figure 2:
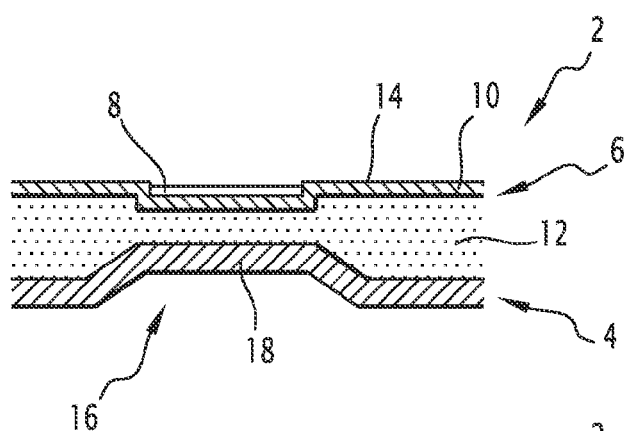
FIG. 2 is a schematic sectional view of a covering according to a first embodiment in accordance with the invention.
Figure 3:
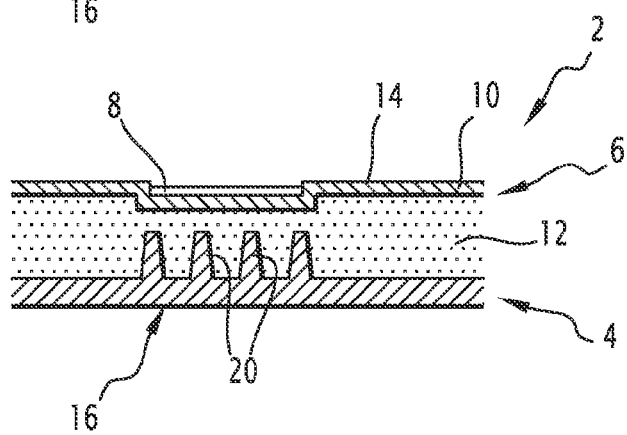
FIG. 3 is a schematic sectional view of a covering according to a second embodiment in accordance with the invention.
Figure 4:
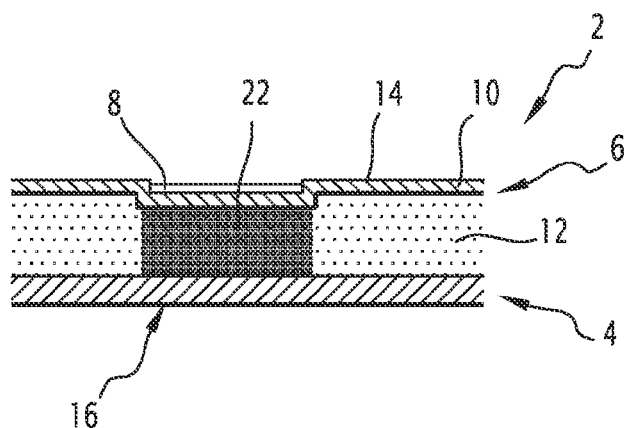
FIG. 4 is a schematic sectional view of a covering according to a third embodiment in accordance with the invention.

The coverings 2 illustrated in FIGS. 2 to 4 differ from that of FIG. 1 in that they further comprise a stiffening component 16 positioned in the trim 6 locally facing the decorative element 8. The stiffening component 16 acts as a stiffening means that is able to limit deformations of the trim 6 by compression. Thus, the vehicle covering may include any stiffening means suitable for limiting compressive deformations of the trim underneath the decorative element.

In the embodiments of FIGS. 2 and 3, the stiffening component 16 is made in one piece with the frame 4 and extends from the frame 4 towards the skin 10.

In the embodiment of FIG. 2, the stiffening component 16 comprises a boss 18 formed in the frame 4 locally facing the decorative element 8. The boss 18 extends into the trim 6. The boss 18 protrudes towards the decorative element 8 relatively to a peripheral region of the frame 4 surrounding the boss 18. The boss 18 is hollow here.

The boss 18 defines with the skin 10 a region of lesser thickness of the trim 6 relatively to a peripheral region of the trim 6 surrounding the decorative element 8. The boss 18 locally prevents too large deformations of the trim 6 and thus stiffens the trim 6 locally. Risks of deterioration are therefore limited.

A compressible material such as a foam has an incompressibility threshold from which the material becomes stiffer and more difficult to compress. Provision of a boss 18 facing the decorative element 8 gives the possibility of reaching the incompressibility threshold of the intermediate layer 12 more rapidly before reaching too large deformations of the decorative element 8 or of the trim 6.

In an embodiment, the thickness of the intermediate layer 12 facing the decorative element 8 is 30 to 80% smaller than that around the decorative element 8, preferably 40 to 70% smaller.

In the embodiment of FIG. 3, the stiffening component 16 comprises a plurality of protrusions 20 provided locally facing the decorative element 8, the protrusions 20 being made with the frame 4 in the same material and protruding from the frame 4 towards the decorative element 8.

The protrusions 20 have the shape of pins and/or ribs. The protrusions 20 are spaced apart from each other.

The protrusions 20 limit the thickness of the intermediate layer 12 between the skin 10 and the free ends of the protrusions 20 adjacent to the skin 10. The protrusions 20 locally limit the deformation of the trims 6 and of the decorative element upon applying a pressure force on the decorative element 8. Risks of deterioration are therefore limited.

In the embodiment of FIG. 4, the stiffening component 16 comprises a block 22 added onto the frame 4 facing the decorative elements 8. The block 22 is inserted into the trim 6 and positioned between the frame 4 and the skin 10. Here, it is embedded in the intermediate layer 12.

The block 22 is stiffer in compression than the intermediate layer 12 for limiting the deformations of the trim 6 to the touch. In an embodiment, the block 22 is stiff to the touch. Alternatively, the block 22 is compressible to the touch so as to allow a small deformation of the trim 6.

The block 22 is advantageously porous, preferably with open cells, so as to be penetrated by the intermediate layer 12 during the manufacturing of the covering 2. In a particular embodiment, the block 22 is a porous foam block with open cells which is stiffer in compression than the intermediate layer 12.

As illustrated in FIG. 4, the block 22 extends from the frame 4 as far as the skin 10. Alternatively, the block 22 extends from the frame 4 towards the skin 10 while being interrupted at a distance from the skin 8.

Preferably, the block 22 is provided on the frame 4. It is initially attached onto the frame 4 before molding the intermediate layer 12 or thermoforming the trim 6 on the frame 4.

Thus, the covering according to the invention allows limitation of the deformation of the trim facing the decorative element and therefore the risk of deterioration of the decorative element or detachment of the decorative element and of the trim, but also reduction in the soft touch of the trim facing the decorative element.

The decorative element may be maintained as a very flexible thin sheet, easy to make and to integrate into the covering and having a low manufacturing cost.

The invention in particular applies to dashboards of motor vehicles and more generally to any covering of a motor vehicle and may for example be applied to the inner covering of motor vehicle doors.

The invention claimed is:

1. A vehicle covering comprising a frame, a trim covering the frame, the trim comprising a skin having a visible external face, and a decorative element positioned on the external face of the skin, characterized in that the vehicle covering further comprises a stiffening component positioned in the trim locally facing the decorative element and capable of limiting deformations of the trim by compression.

2. The covering according to claim 1, wherein the stiffening component comprises a boss formed in the frame locally facing the decorative element and protruding towards the skin.

3. The covering according to claim 1, wherein the stiffening component comprises at least one protrusion made in one piece with the frame locally located facing the decorative element and protruding from the frame towards the skin.

4. The covering according to claim 3, wherein the stiffening component comprises several protrusions facing the decorative element.

5. The covering according to claim 3, wherein the stiffening component comprises at least one protrusion as a pin or a rib.

6. The covering according to claim 1, wherein the stiffening component comprises a block added between the frame and the skin facing the decorative element.

7. The covering according to claim 6, wherein the block is porous.

8. The covering according to claim 6, wherein the block is stiffer in compression than an intermediate layer of the trim interposed between the skin and the frame.

9. The covering according to claim 1, wherein the trim comprises an intermediate layer interposed between the skin and the frame.

10. The covering according to claim 9, wherein the intermediate layer interposed between the skin and the frame is a foam layer giving a soft touch to the trim.

11. The covering according to claim 9, wherein the thickness of the intermediate layer facing the decorative element is 30 to 80% smaller than that around the decorative element.

12. The covering according to claim 9, wherein the thickness of the intermediate layer facing the decorative element is 40 to 70% smaller than that around the decorative element.

13. The covering according to claim 1, wherein the soft touch of the trim is reduced facing the decorative element.

14. A motor vehicle comprising a covering according to claim 1.

15. The covering according to claim 6, wherein the block is porous and is stiffer in compression than an intermediate layer of the trim interposed between the skin and the frame.

16. A vehicle covering comprising:
a frame;
a trim covering the frame, the trim comprising a skin having a visible external face; and
a decorative element positioned on the external face of the skin, wherein the vehicle covering includes stiffening means located adjacent the decorative element for limiting compressive deformations of the trim underneath the decorative element.

17. The covering according to claim 16, wherein the stiffening means comprises a boss formed in the frame locally facing the decorative element and protruding towards the skin.

18. The covering according to claim 16, wherein the stiffening means comprises at least one protrusion made in one piece with the frame locally located facing the decorative element and protruding from the frame towards the skin.

19. The covering according to claim 16, wherein the stiffening means comprises a block added between the frame and the skin facing the decorative element.

20. The covering according to claim 15, wherein the thickness of the intermediate layer facing the decorative element is 30 to 80% smaller than that around the decorative element.

* * * * *